A. E. JOHNSON.
SELF LUBRICATING GEAR WHEEL.
APPLICATION FILED DEC. 18, 1914.
1,169,488.
Patented Jan. 25, 1916.
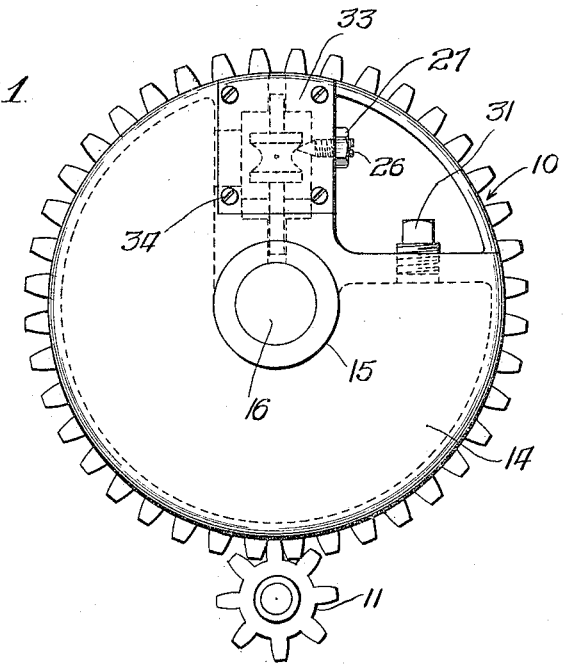
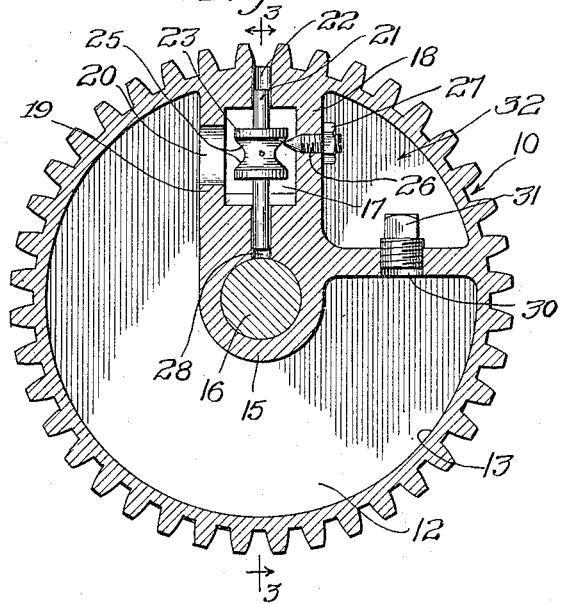
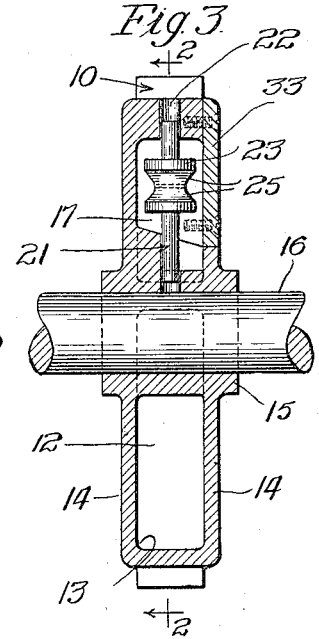
Witnesses:
Harry S. Gaither
Gertrude E. Dowle
Inventor
August E. Johnson
by William E. Hall
Atty.

UNITED STATES PATENT OFFICE.

AUGUST E. JOHNSON, OF ELGIN, ILLINOIS.

SELF-LUBRICATING GEAR-WHEEL.

1,169,488.

Specification of Letters Patent. Patented Jan. 25, 1916.

Application filed December 18, 1914. Serial No. 877,844.

*To all whom it may concern:*

Be it known that I, AUGUST E. JOHNSON, a citizen of the United States, and a resident of Elgin, in the county of Kane and State of Illinois, have invented certain new and useful Improvements in Self-Lubricating Gear-Wheels; and I do hereby declare that the following is a full, clear, and exact description thereof, reference being had to the accompanying drawings, and to the characters of reference marked thereon, which form a part of this specification.

This invention relates to a novel self-lubricating wheel, and the invention consists in the matters hereinafter set forth and more particularly pointed out in the appended claims.

Among the objects of the invention is to provide a gear wheel with self contained means for applying a lubricant to the toothed periphery of the wheel, which in turn applies the lubricant to a meshing gear wheel or pinion so as to thereby avoid cutting of the gear teeth.

Another object of the invention is to provide a novel means for lubricating the bearing on which the wheel is mounted to rotate.

A gear wheel embodying my invention may be used wherever it is necessary or desirable to lubricate the toothed periphery or the bearing thereof, and it is especially adaptable to wind-mill operating mechanisms and other comparatively inaccessible gear wheels.

In the drawings:—Figure 1 is a side view of a gear wheel embodying my invention. Fig. 2 is a section thereof on the line 2—2 of Fig. 3. Fig. 3 is an axial section on the line 3—3 of Fig. 2.

As shown in the drawings, 10 designates the gear wheel, as a whole, and 11 a meshing pinion. The gear wheel is preferably made of a single or integral casting and is cored out to provide an oil reservoir 12 which is inclosed by the toothed rim 13 and by the side walls 14, 14. The hub 15 of the wheel may be mounted to rotate on a shaft 16, or may be fixed to the shaft to rotate therewith, as desired. As herein shown, the wheel is rotative on the shaft. At one side of the hub is arranged an oil feed chamber 17 which is separated from the oil reservoir 12 by side walls 18, 19 made integral with the hub and the toothed rim of the wheel. The said oil feed chamber communicates through an opening 20 with the oil reservoir.

Arranged within said chamber, and disposed radially relatively to the axis of the wheel, is an endwise reciprocating pin 21 which is adapted to extend through an opening 22 in the toothed rim of the wheel. The said pin is made of substantially less diameter than that of the oil opening so as to permit a film of oil to pass around the same from the feed chamber to the toothed periphery of the wheel. The pin is herein shown as provided with a weight 23 so that as the wheel revolves the pin is shifted endwise by gravity through the feed chamber and the oil opening 22 and carries oil with it into and through said opening in small quantities. The pin will thus be projected into said opening 22 when the said chamber 17 is below the axis of the wheel and will return to the position shown in Fig. 2 as the chamber rises above said axis. The said weight 23 may be pinned or otherwise rigidly secured to the oil feed pin.

I may provide means for varying the throw of the said reciprocating pin so as to vary the amount of oil fed during each movement thereof, depending upon the character of the oil with respect to its fluidity. This may be effected by providing the weight 23 with opposed cone surfaces 25 between which is adapted to enter the pointed end of a screw-threaded adjusting stud 26 which extends through and is screw-threaded to the wall 18. By moving the pin inwardly an doutwardly toward and from said opposing cone surfaces the length of the throw of the feed pin 21 may be varied as desired. A lock nut 27 may be applied to lock the stud in its adjusted positions.

In order to conveniently fill the reservoir 12 I may provide an opening in the wall 30 thereof, which is normally closed by a screw-threaded plug 31. A recess 32 is formed in the wheel adjacent to said plug and adjusting stud 26 to afford convenient access to said parts. Conveniently, in the manufacture of the wheel one side of the feed chamber is covered by a removable plate 33, fixed in place by the screws 34, whereby access may be had to the chamber to place the weighted feed pin in the chamber. The parts may be assembled by first placing the hollow weight 23 in the chamber and thereafter inserting the pin through the opening 22 and the weight and then pinning or otherwise fixing the weight to said pin. In addition to thus applying a lubricant to the toothed periphery of the gear wheel, I may also by the same feed device automatically apply a lubricant to the shaft 16 in constructions where the wheel revolves on the shaft. This may be conveniently effected by forming an oil passage 28 in the hub which extends to the shaft and elongating the pin 21 to extend into said passage such distance that by its reciprocation oil is carried from the oil chamber to the shaft bearing; the single pin thus serving to alternately lubricate the shaft and the toothed periphery of the gear wheel.

It will be understood that my invention is capable of embodiments in structures which differ specifically from that herein disclosed while following the spirit of the broader claims hereto appended.

I claim as my invention:—

1. A gear wheel provided with a self-contained reservoir, and provided in its toothed rim with a feed opening, and a feed pin adapted to reciprocate through said opening to feed a lubricant from said reservoir to the toothed periphery of the wheel.

2. A hollow gear wheel formed to provide a self-contained reservoir and a feed chamber in communication therewith, and provided with a feed opening leading from said feed chamber to the toothed periphery of the wheel, a lubricant feeding piece freely slidable through said chamber and said opening and a guide for the inner end of said piece.

3. A gear wheel provided with a self-contained reservoir, and provided in its toothed rim with a feed opening, a feed pin adapted to reciprocate through said opening to feed a lubricant from said reservoir to the toothed periphery of the wheel, and means to vary the throw of said feed pin.

4. A gear wheel provided with a self-contained reservoir and provided in its toothed rim with a feed opening, a feed pin adapted to reciprocate through said feed opening to feed a lubricant from said reservoir to the toothed periphery of the wheel, and means to adjust the throw of said feed pin comprising a part on the pin having opposed tapered surfaces and a screw-threaded adjusting stud adapted to extend between said opposed tapered surfaces.

5. A gear wheel and a shaft on which said wheel rotates, with means for lubricating the toothed periphery of said wheel and the shaft bearing, comprising a self contained reservoir in said wheel with feed openings leading therefrom to said toothed periphery and said bearing, and a feed member adapted to reciprocate alternately through said openings.

6. A gear wheel provided with a hub to rotate on a shaft and having an oil feed aperture, a toothed rim also having an oil feed aperture, said wheel being provided with an internal oil reservoir communicating with said apertures, and a single device to control the flow of oil through both of said apertures.

7. A gear wheel provided with an internal oil chamber and with a toothed rim, the said rim being provided with a feed passage leading from the chamber to the exterior of the toothed rim and a feed pin reciprocating through said passage and chamber and having guiding engagement with the wheel structure radially inside said passage.

8. A self lubricating gear wheel comprising a toothed rim, a hub and a cored out body divided into a reservoir and a filling recess, a filling opening between said recess and reservoir provided with a closure, said rim being provided with an oil feed passage leading to the exterior of the toothed rim and a feed device reciprocable through said passage.

9. A self lubricating gear wheel comprising a toothed rim, a hub and a cored out body divided into a reservoir and a filling recess, a filling opening between said recess and reservoir provided with a closure, said wheel being provided with an oil feed passage leading to the exterior of the toothed rim, a feed device reciprocable through said passage, adjusting means for the feed device extending into said recess and a removable closure plate covering said passage.

10. A wheel and a shaft on which said wheel rotates, said wheel being hollow to provide a reservoir, the hub of the wheel being provided with a feed opening which leads from the reservoir to the shaft bearing, a feed pin reciprocable through said opening, and adjusting means acting on the pin between the ends of the latter and accessible from the exterior of the reservoir.

11. A wheel and a shaft on which said wheel rotates, said wheel being hollow to provide a reservoir, the hub of the wheel being provided with a feed opening which leads from the reservoir to the shaft bearing, a feed pin reciprocable through said opening, and guiding means radially exterior to the hub of the wheel to receive the outer end of said pin.

In testimony, that I claim the foregoing as my invention I affix my signature in the presence of two witnesses, this 5th day of December, A. D. 1914.

AUGUST E. JOHNSON.

Witnesses:
W. L. HALL,
G. E. DOWLE.